United States Patent
Saito et al.

(10) Patent No.: US 9,945,476 B2
(45) Date of Patent: Apr. 17, 2018

(54) APPARATUS AND METHOD FOR CONTROLLING VEHICLE

(71) Applicant: MAZDA MOTOR CORPORATION, Hiroshima (JP)

(72) Inventors: Tadashi Saito, Hiroshima (JP); Yasunari Nakayama, Kure (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 434 days.

(21) Appl. No.: 14/835,338

(22) Filed: Aug. 25, 2015

(65) Prior Publication Data

US 2016/0091087 A1    Mar. 31, 2016

(30) Foreign Application Priority Data

Sep. 25, 2014  (JP) .................. 2014-195467

(51) Int. Cl.
*F16H 61/14*    (2006.01)
(52) U.S. Cl.
CPC ....... *F16H 61/143* (2013.01); *F16H 2312/04* (2013.01)
(58) Field of Classification Search
CPC .............. F16H 61/143; F16H 2312/04; B60W 10/026; B60W 30/18118
See application file for complete search history.

(56) References Cited

U.S. PATENT DOCUMENTS 6,056,667 A  *  5/2000  Sasaki ................... F16H 61/143
                                                                    477/174
7,815,543 B2 * 10/2010  Kakiuchi .............. F16H 61/143
                                                                    477/176

FOREIGN PATENT DOCUMENTS

| JP | H04-71934 A | 3/1992 |
| JP | 2003-343718 A | 12/2003 |
| JP | 2004-075843 A | 3/2004 |
| JP | 2004-150531 A | 5/2004 |

\* cited by examiner

*Primary Examiner* — Erin D Bishop
(74) *Attorney, Agent, or Firm* — Studebaker & Brackett PC

(57) ABSTRACT

An apparatus for controlling a vehicle includes a torque converter including a lockup clutch, and a lockup controller configured to controllably move the lockup clutch from a released state in an engagement direction when the vehicle has just started. The apparatus further includes a rolling-down sensor configured to sense whether or not the vehicle that has just started has rolled down, and a lockup retarder configured to retard the movement of the lockup clutch in the engagement direction if the vehicle is sensed to have rolled down.

9 Claims, 7 Drawing Sheets

FIG.3

| RANGE/GEAR | | LOW CLUTCH (40) | HIGH CLUTCH (50) | L/R BRAKE (60) | 26 BRAKE (70) | R35 BRAKE (80) |
|---|---|---|---|---|---|---|
| N | NEUTRAL | | | ○ | | |
| D | FIRST GEAR | ○ | | ○ | | |
| | SECOND GEAR | ○ | | | ○ | |
| | THIRD GEAR | ○ | | | | ○ |
| | FOURTH GEAR | ○ | ○ | | | |
| | FIFTH GEAR | | ○ | | ○ | |
| | SIXTH GEAR | | ○ | | | ○ |
| R | REVERSE GEAR | | | ○ | | ○ |

APPARATUS AND METHOD FOR CONTROLLING VEHICLE

CROSS-REFERENCE TO RELATED APPLICATION

This application claims priority to Japanese Patent Application No. 2014-195467 filed on Sep. 25, 2014, the entire disclosure of which is incorporated by reference herein.

BACKGROUND

The present disclosure relates to an apparatus and method for controlling a vehicle, and more particularly relates to an apparatus and method for controlling a vehicle including a torque converter with a lockup clutch.

A generally known automatic transmission mounted in a vehicle includes a torque converter coupled to an output shaft of an engine, and a transmission mechanism coupled to the output side of the torque converter and including a plurality of frictional engagement elements such as clutches and brakes, and is designed to selectively engage the frictional engagement elements to define a plurality of gears having different reduction gear ratios.

The torque converter of the automatic transmission includes a pump rotating together with a crankshaft of the engine, a turbine facing the pump and driven via a fluid by the pump, and a stator arranged inside facing portions of the pump and the turbine. The fluid circulates through the interior of a torus, comprised of the pump, the turbine, and the stator, along blades in the order of the pump, the turbine, and the stator, thereby transmitting engine output torque to the output side of the torque converter.

If the difference in rotational speed between the pump on the input side and the turbine on the output side is large, e.g., when the vehicle has just started or when the vehicle is accelerating, the stator between the pump and the turbine rectifies the flow of the fluid out of the turbine, and sends the fluid back to the pump, thereby enabling this torque converter to function to amplify torque.

It has also been known that such a torque converter is provided with a lockup clutch for directly connecting the pump and the turbine together, and the engagement of this lockup clutch eliminates the loss of torque transmitted between the pump and the turbine and improves the fuel economy performance of the engine.

In connection with this, Japanese Unexamined Patent Publication No. 2004-150531, for example, discloses a technique in which when a vehicle including a torque converter with a lockup clutch has just started, the lockup clutch is controllably moved in the direction of its engagement.

However, if, in the vehicle that has just started, the lockup clutch is controllably moved in the direction of its engagement as described above, part of the engine output torque is distributed to the lockup clutch. Thus, the engine output torque distributed to the torus decreases. If the engine output torque distributed to the torus decreases, the torque converter may fail to adequately function to amplify torque. As a result, if the vehicle that has been stopped on an uphill road and that has just started rolls down, the starting performance of the vehicle may decline because the torque converter fails to adequately function to amplify torque.

Note that the problem described above applies not only to vehicles including an automatic transmission, but also to vehicles including a continuously variable transmission or any other suitable power transmission.

SUMMARY

The present disclosure provides a vehicle controlling apparatus that reduces a decline in the starting performance of a vehicle when the vehicle that has just started rolls down on an uphill road.

An apparatus for controlling a vehicle according to an aspect of the present disclosure includes:
a torque converter including a lockup clutch;
a lockup controller configured to controllably move the lockup clutch from a released state in an engagement direction when the vehicle has just started;
a rolling-down sensor configured to sense whether or not the vehicle that has just started has rolled down; and
a lockup retarder configured to retard the movement of the lockup clutch in the engagement direction if the rolling-down sensor senses that the vehicle that has just started has rolled down.

BRIEF DESCRIPTION OF THE DRAWINGS

FIG. 3 is a table showing the engagement of frictional engagement elements of the automatic transmission.

DETAILED DESCRIPTION

Figure 1:
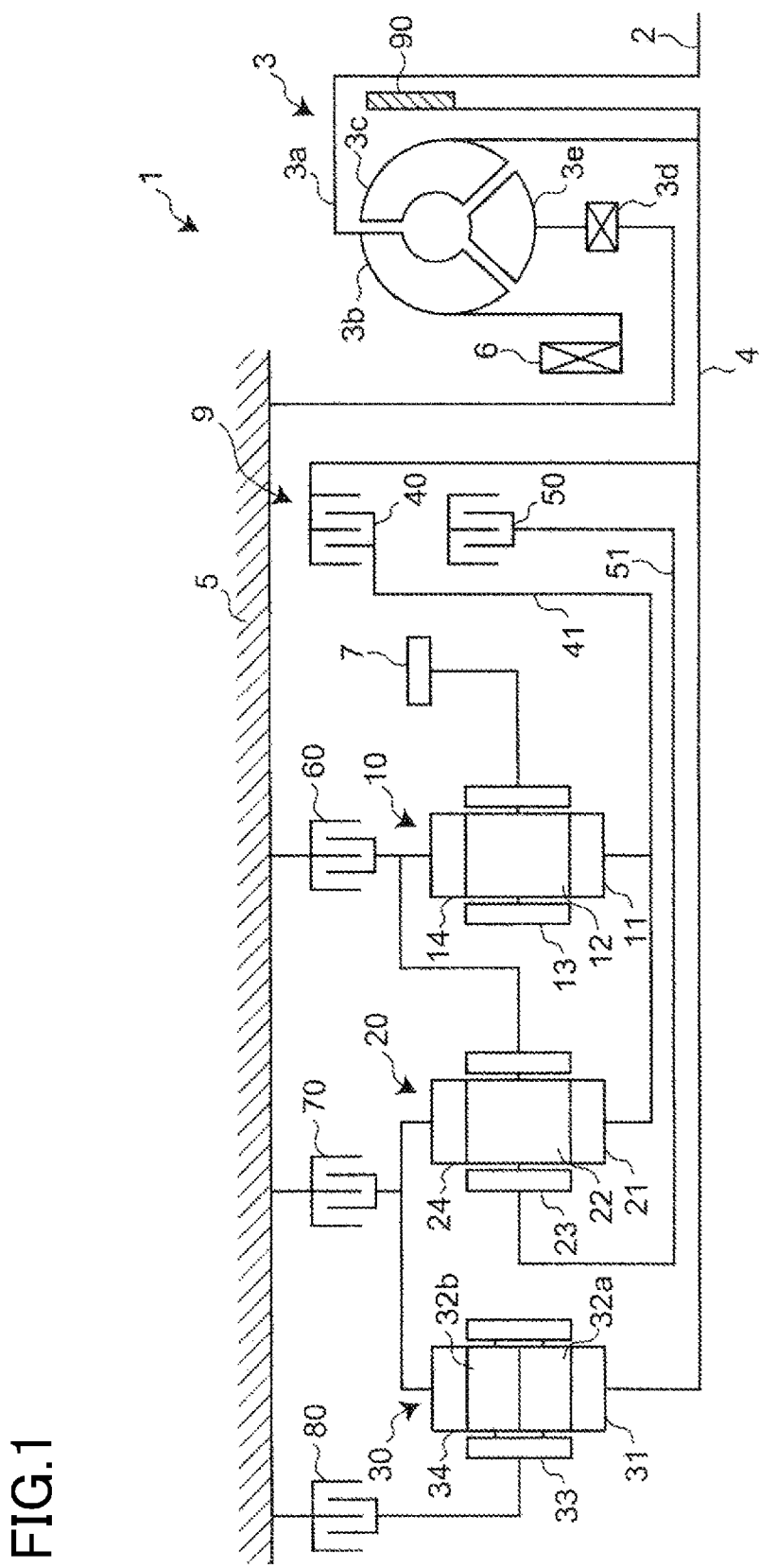
FIG. 1 is a skeleton diagram of an automatic transmission according to an embodiment.

An apparatus for controlling a vehicle according to an aspect of the present disclosure includes:
a torque converter including a lockup clutch;
a lockup controller configured to controllably move the lockup clutch from a released state in an engagement direction when the vehicle has just started;
a rolling-down sensor configured to sense whether or not the vehicle that has just started has rolled down; and
a lockup retarder configured to retard the movement of the lockup clutch in the engagement direction if the rolling-down sensor senses that the vehicle that has just started has rolled down.

According to the configuration described above, if a vehicle that has just started is sensed to have rolled down, the movement of a lockup clutch in an engagement direction is retarded. Thus, much of the engine output torque is transmitted to a torus, thus allowing a torque converter to adequately function to amplify torque. Thus, when the vehicle that has just started on an uphill road rolls down, a decline in the starting performance of the vehicle is reduced.

If the rolling-down sensor senses that the vehicle that has just started has rolled down, the lockup retarder may delay a start of the movement of the lockup clutch in the engagement direction.

Since the lockup retarder delays the start of the movement of the lockup clutch in the engagement direction, a decline in the starting performance of the vehicle that is rolling down is reliably reduced.

If the rolling-down sensor senses that the vehicle has stopped rolling down, the lockup retarder may stop retarding the movement of the lockup clutch in the engagement direction.

If the rolling-down sensor senses that the vehicle has stopped rolling down, the lockup retarder stops retarding the movement of the lockup clutch in the engagement direction. Thus, a decline in fuel economy performance is reduced by lockup.

A clutch clearance of the lockup clutch may be substantially zero when no engagement hydraulic pressure is supplied to the lockup clutch.

Since, when no engagement hydraulic pressure is supplied to the lockup clutch, the clutch clearance of the lockup clutch is substantially zero, a decline in the starting performance of the vehicle that is rolling down is also reliably reduced if the lockup clutch that will be responsively engaged when the engagement hydraulic pressure is supplied thereto is used.

Furthermore, another aspect of the present disclosure is directed to a method for controlling a vehicle comprising a torque converter including a lockup clutch, and a lockup controller configured to controllably move the lockup clutch from a released state in an engagement direction when the vehicle has just started. The method includes: sensing whether or not the vehicle that has just started has rolled down; and retarding the movement of the lockup clutch in the engagement direction if the vehicle that has just started is sensed to have rolled down.

An embodiment will now be described with reference to the attached drawings.

FIG. 1 is a skeleton diagram of an automatic transmission according to the embodiment. This automatic transmission 1 includes a torque converter 3 coupled to an output shaft 2 of an engine, and a transmission mechanism 9 coupled to the output side of the torque converter 3 via an input shaft 4 and receiving power from the torque converter 3. The torque converter 3 and the transmission mechanism 9 are arranged on the axis of the input shaft 4, and are housed in a transmission case 5.

The torque converter 3 includes a case 3a coupled to the output shaft 2 of the engine, a pump 3b fixed in the case 3a, a turbine 3c facing the pump 3b and driven via hydraulic oil by the pump 3b, a stator 3e interposed between the pump 3b and the turbine 3c, supported via a one-way clutch 3d on the transmission case 5, and amplifying torque, and a lockup clutch 90 arranged between the case 3a and the turbine 3c to directly connect the output shaft 2 of the engine and the turbine 3c together via the case 3a. Thus, the rotation of the turbine 3c is transmitted through the input shaft 4 to the transmission mechanism 9.

Also, a mechanical oil pump 6, which is driven by the engine via the torque converter 3, is arranged between the torque converter 3 and the transmission mechanism 9. In transmission mechanism 9, an output gear 7 to output power from the transmission mechanism 9 to driving wheels (not shown) is arranged on the axis of the input shaft 4.

The transmission mechanism 9 includes, as frictional engagement elements constituting the transmission mechanism 9, a low clutch 40, a high clutch 50, a low/reverse (L/R) brake 60, a 2/6 brake 70, and an R/3/5 brake 80. The low and high clutches 40 and 50 are arranged adjacent to the torque converter 3, that is, the drive source of the output gear 7, and the L/R brake 60, the 2/6 brake 70, and the R/3/5 brake 80 are arranged away from the torque converter 3, that is, the drive source of the output gear 7, in this order from the torque converter 3 side.

The transmission mechanism 9 further includes, on the axis of the input shaft 4, first, second, and third planetary gear sets (hereinafter referred to as "first, second, and third gear sets") 10, 20, and 30, which are arranged further away from the torque converter 3 than the output gear 7 in the transmission case 5 in this order from the torque converter 3 side.

The first and second gear sets 10 and 20 out of the first, second, and third gear sets 10, 20, and 30 are of a single pinion type, and each include a sun gear 11, 21, a plurality of pinions 12, 22 meshing with the sun gear 11, 21, and a carrier 13, 23 supporting these pinions 12, 22, and a ring gear 14, 24 meshing with associated ones of these pinions 12, 22.

The third gear set 30 is of a double pinion type, and includes a sun gear 31, a plurality of first pinions 32a meshing with the sun gear 31, a plurality of second pinion 32b each meshing with an associated one of the first pinions 32a, a carrier 33 supporting these pinions 32a and 32b, and a ring gear 34 meshing with the second pinion 32b.

Furthermore, the input shaft 4 is directly coupled to the sun gear 31 of the third gear set 30, and the sun gears 11 and 21 of the first and second gear sets 10 and 20 are joined together so as to be coupled to an output member 41 of the low clutch 40. An output member 51 of the high clutch 50 is also coupled to the carrier 23 of the second gear set 20.

Also, the ring gear 14 of the first gear set 10 and the carrier 23 of the second gear set 20 are joined together, and the L/R brake 60 is arranged between these joined members and the transmission case 5. The ring gears 24 and 34 of the second and third gear sets 20 and 30 are joined together, the 2/6 brake 70 is arranged between these joined members and the transmission case 5, and the R/3/5 brake 80 is arranged between the carrier 33 of the third gear set 30 and the transmission case 5. Furthermore, the output gear 7 is coupled to the carrier 13 of the first gear set 10.

Figure 2:
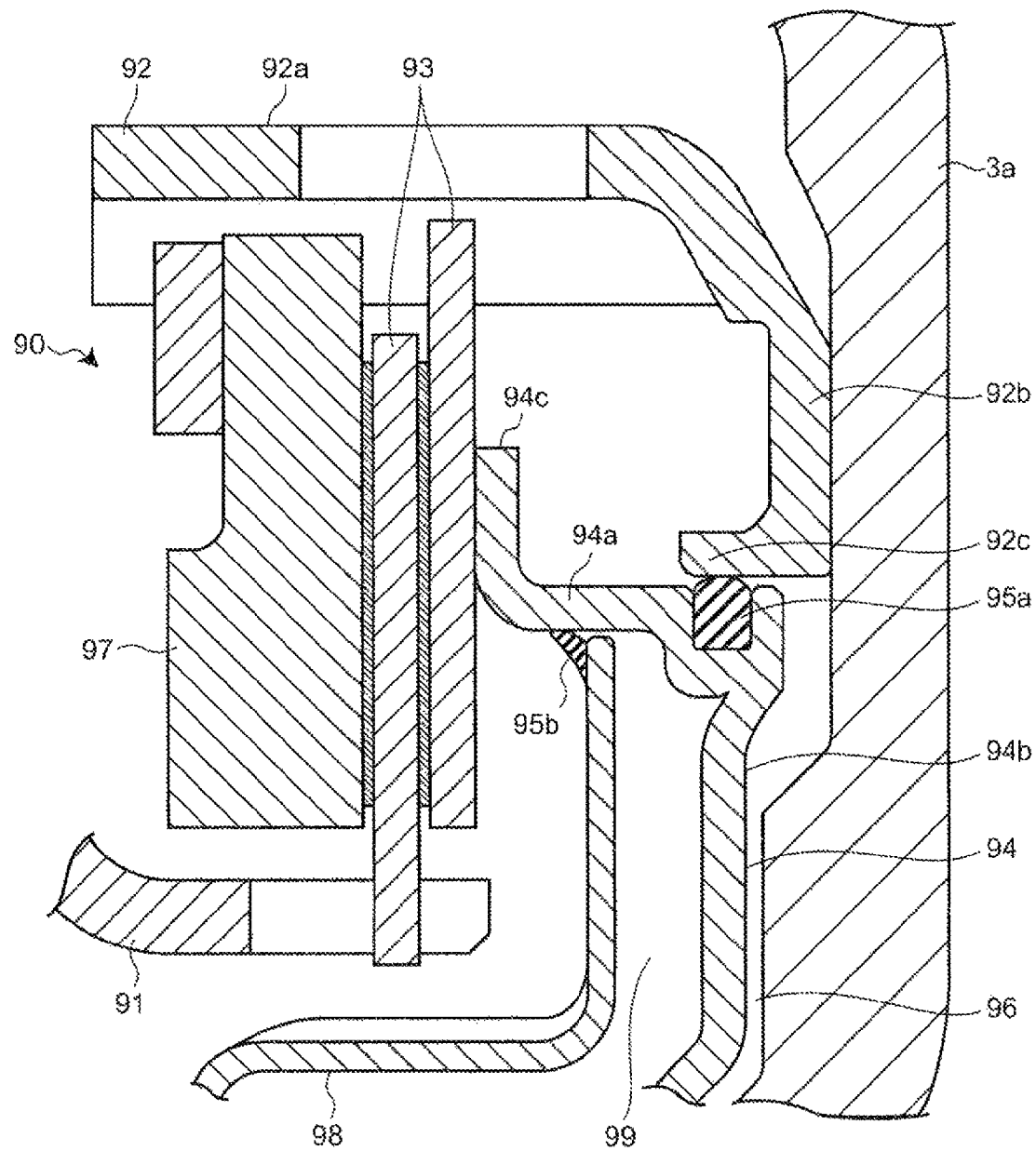
FIG. 2 is a cross-sectional view illustrating a lockup clutch of the automatic transmission.

As illustrated in FIG. 2, the lockup clutch 90 includes a clutch hub 91 and a clutch drum 92 that are arranged concentrically, a plurality of friction discs 93 arranged between the clutch hub 91 and the clutch drum 92 and alternately engaging with them, and a piston 94 pressing the friction discs 93.

The clutch drum 92 includes an outer cylindrical portion 92a with which the friction disc(s) 93 engages and which extends axially, a bottom portion 92b extending radially from a portion of the outer cylindrical portion 92a adjacent to the engine, and an inner cylindrical portion 92c extending from an inner portion of the bottom portion 92b in the axial direction away from the engine. The bottom portion 92b is joined to the case 3a.

The piston 94 is fitted to the inner peripheral surface of the inner cylindrical portion 92c of the clutch drum 92, and an annular seal member 95a is interposed between the inner cylindrical portion 92c of the clutch drum 92 and the piston 94.

The piston 94 includes a cylindrical portion 94a fitted into the inner cylindrical portion 92c of the clutch drum 92 and extending axially, a hydraulic receiver portion 94b extending radially inward from a portion of the cylindrical portion 94*a* adjacent to the engine, and a pressing portion 94*c* extending radially outward from a portion of the cylindrical portion 94*a* away from the engine.

A hydraulic chamber 96 into which the hydraulic pressure for engaging the lockup clutch is supplied is formed behind the piston 94, i.e., between the piston 94 and the case 3*a*. When a predetermined engagement hydraulic pressure has been supplied into the hydraulic chamber 96, the piston 94 presses the friction discs 93 toward a retainer 97, and the lockup clutch 90 is engaged.

The lockup clutch 90 further includes a plate member 98 arranged further away from the engine than the piston 94, and a centrifugal balance chamber 99 is defined between the plate member 98 and the piston 94. The plate member 98 is fixed to the case 3*a*, and is provided, at its radially outer end portion, with a seal member 95*b*. This seal member 95*b* seals the space between the cylindrical portion 94*a* of the piston 94 and the plate member 98.

By introducing hydraulic oil into the centrifugal balance chamber 99 defined between the plate member 98 and the piston 94, the centrifugal force acting on hydraulic oil in the centrifugal balance chamber 99 cancels the centrifugal force acting on hydraulic oil in the hydraulic chamber 96, which can prevent the piston 94 from moving in the engagement direction when the lockup clutch 90 is in a released state.

The centrifugal balance chamber 99 communicates with a case internal pressure chamber filled with hydraulic oil for transmitting power between the pump 3*b* and the turbine 3*c*, thus allowing part of the hydraulic oil to be introduced from the case internal pressure chamber into the centrifugal balance chamber 99.

If, to engage the lockup clutch 90, a predetermined engagement hydraulic pressure is supplied into the hydraulic chamber 96, the piston 94 is pressed by the engagement hydraulic pressure to engage the lockup clutch 90, thereby directly connecting, through the case 3*a*, the output shaft 2 of the engine and the turbine 3*c* together.

Furthermore, in the lockup clutch 90, when the lockup clutch 90 is engaged, the friction discs 93, the retainer 97, and other members are elastically deformed under the pressing force exerted by the piston 94, and in such a situation, the friction discs 93 are engaged. If, to release the lockup clutch 90, the engagement hydraulic pressure for the lockup clutch is released from the hydraulic chamber 96, the piston 94 moves in a release direction due to the elastic resilience of the friction discs 93, the retainer 97, and other members, and is thus retained by the seal member 95*a* and other suitable members at a position where the pressing force exerted by the piston 94 becomes substantially zero, i.e., at a position where the clearance between the friction disc 93 and the piston 94 becomes substantially zero.

Since the lockup clutch 90 is configured such that when the lockup clutch 90 is in the released state, the piston 94 is retained at the position where the clearance between the friction disc 93 and the piston 94 becomes substantially zero, the lockup clutch 90 can be engaged with high responsivity.

With the configuration described above, in the automatic transmission 1, ranges, i.e., neutral (N), forward (D), and reverse (R) ranges, and first through sixth gears in the D range are defined in accordance with which of the low clutch 40, the high clutch 50, the L/R brake 60, the 2/6 brake 70, and the R/3/5 brake 80 is/are engaged as shown in the table of FIG. 3. Note that in FIG. 3, if the low clutch 40, the high clutch 50, the L/R brake 60, the 2/6 brake 70, or the R/3/5 brake 80 is engaged, the corresponding cell is marked with a circle.

Figure 4:
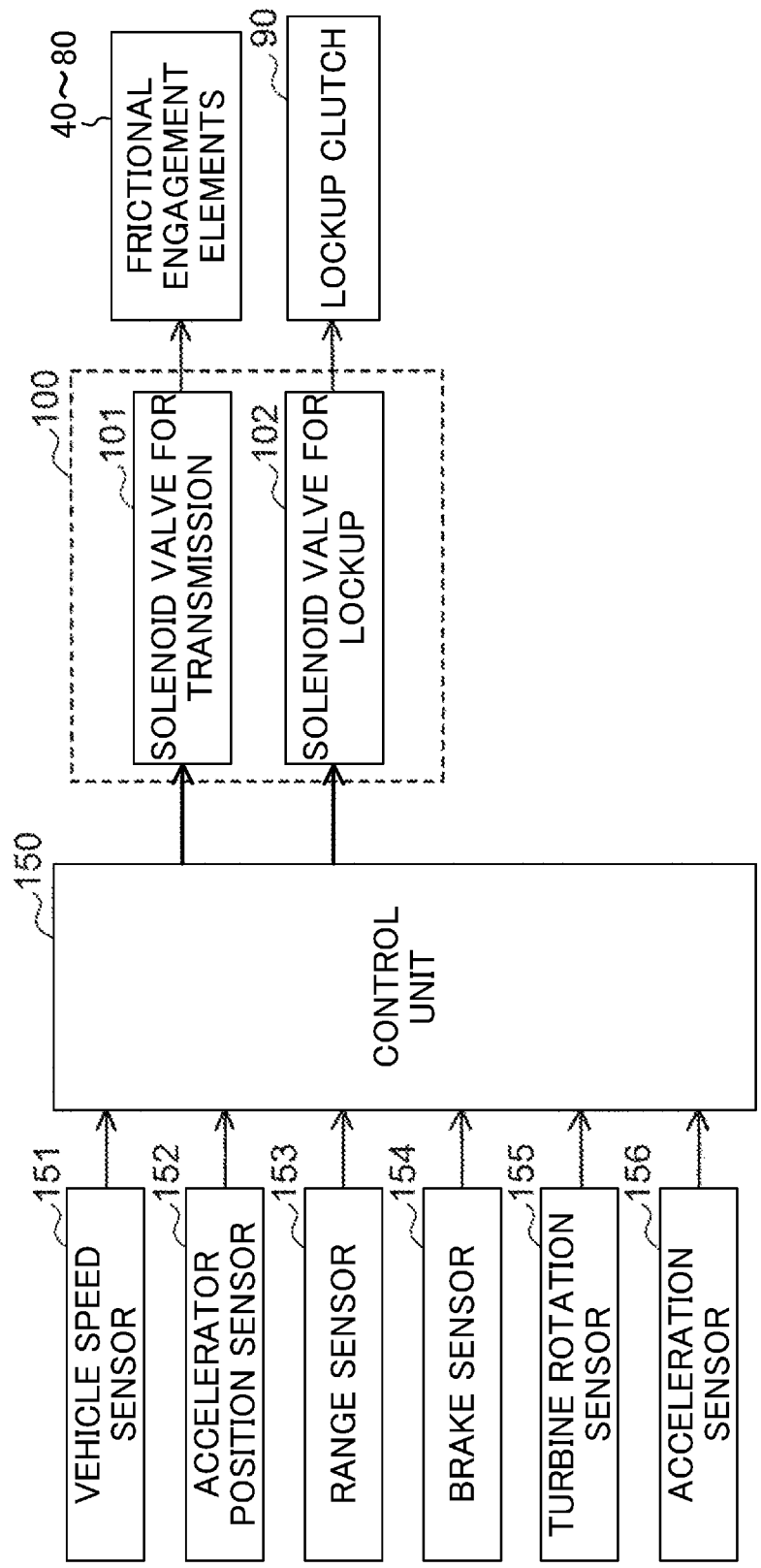
FIG. 4 is a diagram of a control system for the automatic transmission and an engine.

Also, the automatic transmission 1 includes a hydraulic control circuit 100 for selectively supplying the hydraulic pressure to the low clutch 40, the high clutch 50, the L/R brake 60, the 2/6 brake 70, and the R/3/5 brake 80 to define gears as shown in FIG. 4. The hydraulic control circuit 100 includes a frictional engagement element solenoid valve 101 for controlling the engagement of the frictional engagement elements such as the low clutch 40, the high clutch 50, the L/R brake 60, the 2/6 brake 70, and the R/3/5 brake 80, and a lockup clutch solenoid valve 102 for controlling the engagement of the lockup clutch 90.

In addition to the components described above, the automatic transmission 1 includes a control unit 150 as a controller that controls the solenoid valves of the hydraulic control circuit 100 to define one of the gears in accordance with the operating state. The control unit 150 receives signals from a vehicle speed sensor 151 that senses the vehicle speed, an accelerator position sensor 152 that senses the degree to which a driver depresses the accelerator pedal (accelerator position), a range sensor 153 that senses the range selected by the driver, a brake sensor 154 that senses whether or not the driver has depressed the brake pedal, a turbine rotation sensor 155 that senses the rotational speed of the turbine 3*c*, and an acceleration sensor 156 that senses the acceleration of the vehicle, and other suitable signals.

The control unit 150 controls the engine based on these signals, and outputs a control signal to each of the frictional engagement element solenoid valve 101, the lockup clutch solenoid valve 102, and the other solenoid valves in the hydraulic control circuit 100. Thus, the hydraulic pressure is selectively supplied to the predetermined frictional engagement elements to define one of the gears in accordance with the operating state. Note that the control unit 150 includes a microcomputer as its main part.

Furthermore, the control unit 150 can switch the lockup clutch 90 to the released state, the slipping state, or the engaged state by controlling the lockup clutch solenoid valve 102.

Figure 5:
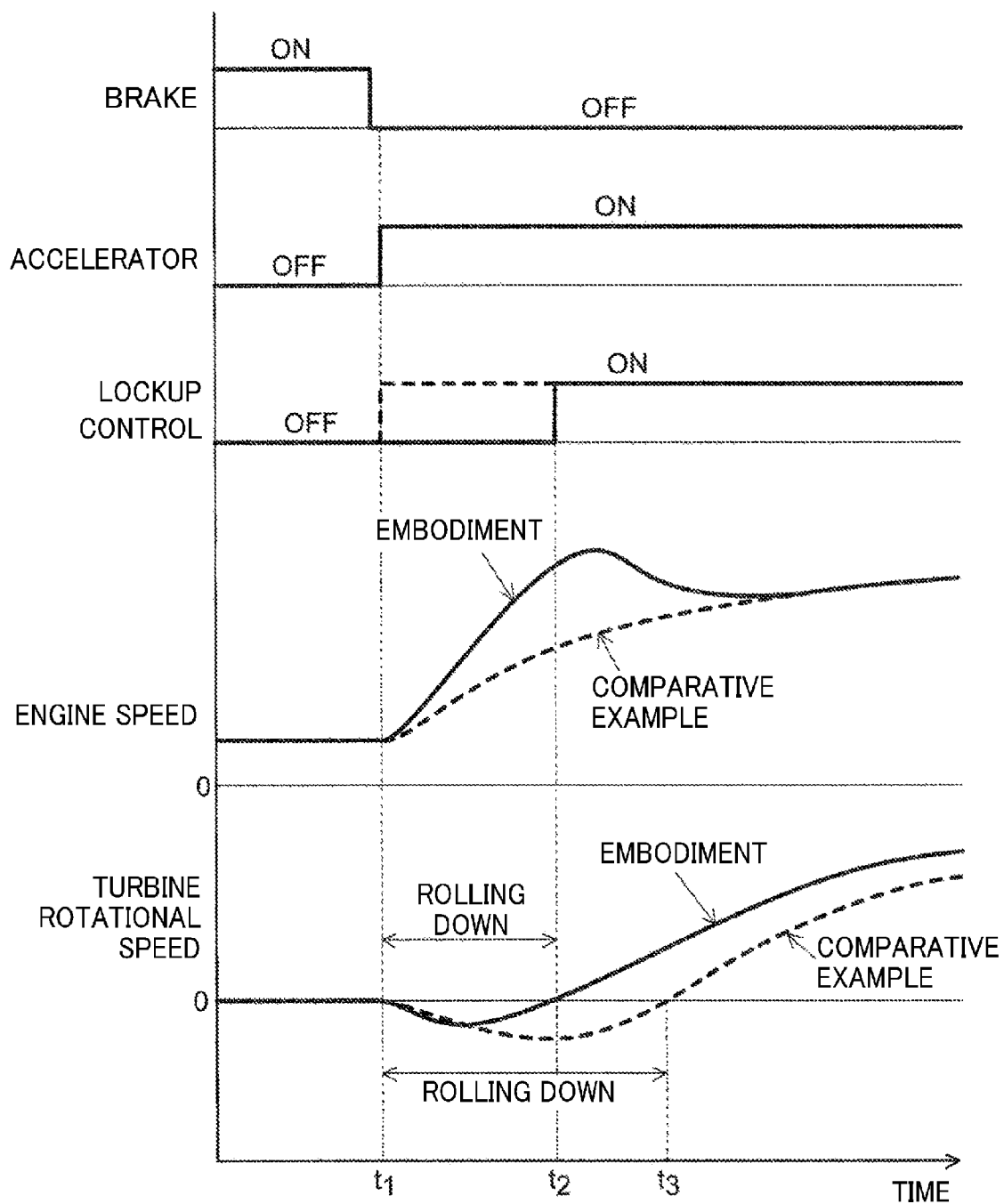
FIG. 5 is a time chart explaining how an automatic transmission according to an embodiment performs control when a vehicle has just started.

FIG. 5 is a time chart for explaining how an automatic transmission according to the embodiment of the present invention performs control when a vehicle has just started. The time chart in FIG. 5 shows a situation where a stopped vehicle has just started on an uphill road. The vehicle is in a state in which the D range is selected, the brake is turned on, the low clutch 40 and L/R brake 60 of the automatic transmission 1 are engaged, and the lockup clutch 90 is in the released state with no hydraulic pressure supplied thereto. The engine is controlled such that the engine speed is equal to the idling engine speed.

Suppose that when the brake pedal of a stopped vehicle is released, i.e., the brake is switched from the on state to the off state, and the accelerator pedal is depressed, i.e., the accelerator is switched from the off state to the on state, at a time t1 to start the vehicle as shown in FIG. 5, the vehicle rolls down on the uphill road. In that case, this downward rolling is sensed by the control unit 150 in this embodiment, and the start of lockup control is thus delayed.

At this time, since the lockup clutch 90 is in the released state, the engine speed increases, and much of the engine output torque is transmitted to the torus, thus allowing the torque converter 3 to adequately function to amplify torque. This function of amplifying torque accelerates the increase in turbine rotational speed, and the vehicle is prevented from rolling down at a time t2. At this time t2, the control unit 150 senses that the vehicle has been prevented from rolling down, and lockup control is performed.

With respect to this, FIG. 5 shows a comparative example in which when a vehicle has just started, lockup control is immediately started irrespective of whether or not the vehicle is sensed to have rolled down. In this comparative example, when the vehicle has just started, the lockup clutch 90, which enters the slipping state, reduces an increase in engine speed, thereby preventing the torque converter 3 from adequately functioning to amplify torque. Thus, in the comparative example, an increase in turbine rotational speed is delayed, the vehicle is prevented from rolling down at a time t3 when a predetermined period of time has passed since the time t2, and lockup control is performed at this time t3.

As can be seen, while, in this embodiment, the vehicle that has just started on an uphill road rolls down only for the period between the times t1 and t2, the vehicle of the comparative example rolls down longer between the times t2 and t3. Thus, in this embodiment, the period of time in which the vehicle rolls down is shorter than in the comparative example, thus reducing the downward rolling of the vehicle.

Figure 6:
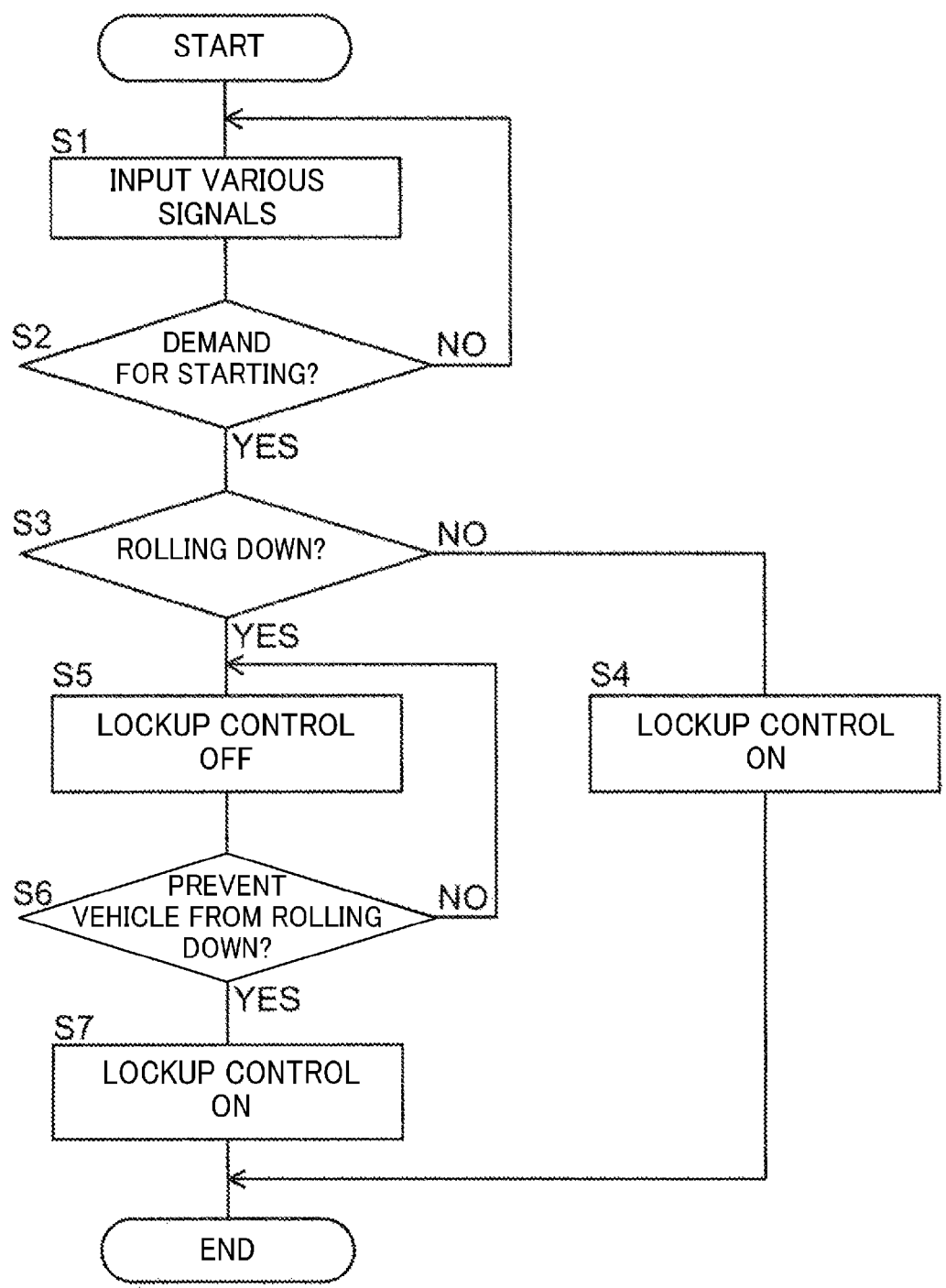
FIG. 6 is a flow chart showing a control operation of an automatic transmission according to an embodiment when a vehicle has just started.

FIG. 6 is a flow chart showing a control operation of an automatic transmission according to the embodiment when a vehicle has just started. As shown in FIG. 6, the D range is selected, the brake is turned on, the low clutch 40 and L/R brake 60 of the automatic transmission 1 are engaged, and the control unit 150 receives various signals while the vehicle is stopped without supplying the hydraulic pressure to the lockup clutch 90 (step S1). The engine is controlled such that the engine speed is equal to the idling engine speed.

Next, a determination is made, based on signals output from the brake sensor 154 and the accelerator position sensor 152, whether or not the brake pedal has been released and the accelerator pedal has been depressed, i.e., whether or not there has been a demand for starting the vehicle (step S2).

If the determination result in step S2 is "NO," i.e., if there has been no demand for starting the vehicle, step S1 is repeated. On the other hand, if the determination result in step S2 is "YES," i.e., if a determination is made that there has been a demand for starting the vehicle, a determination is made, based on signals output from the acceleration sensor 156 and the turbine rotation sensor 155, whether or not the vehicle has rolled down (step S3).

In this embodiment, the turbine rotation sensor 155 can determine the absolute value of the turbine rotational speed in the torque converter 3, but cannot sense the direction of rotation of the turbine 3c. Thus, a determination cannot be made, only based on a signal output from the turbine rotation sensor 155, whether the vehicle is moving forward. Therefore, it is further required to determine, based on the signal output from the acceleration sensor 156, whether the vehicle is moving in the forward or backward direction.

If the determination result in step S3 is "NO," i.e., if the vehicle has not rolled down, lockup control is performed (step S4).

If the determination result in step S3 is "YES," i.e., if the vehicle has rolled down, no lockup control is performed (step S5), and a determination is made whether or not the vehicle has been prevented from rolling down (step S6).

If the determination result in step S6 is "NO," until the vehicle is prevented from rolling down, step S5 is repeated. Once the determination in step S6 results in "YES," i.e., once the vehicle has been prevented from rolling down, lockup control is performed (step S7).

As can be seen from the foregoing description, according to this embodiment, when the vehicle that has just started is sensed to have rolled down, the controllable movement of the lockup clutch 90 in the engagement direction is retarded, and much of the engine output torque is, therefore, transmitted to the torus, thereby allowing the torque converter 3 to adequately function to amplify torque. Thus, when the vehicle has just started on an uphill road, a decline in the starting performance of the vehicle that is rolling down can be reduced.

Furthermore, according to this embodiment, a lockup retarder delays a start of the controllable movement of the lockup clutch 90 in the engagement direction, thereby reliably reducing a decline in the starting performance of the vehicle that is rolling down.

In addition, according to this embodiment, when no engagement hydraulic pressure is supplied to the lockup clutch 90, the clearance between the friction disc 93 and the piston 94 becomes substantially zero. Thus, if the engagement hydraulic pressure is supplied to the lockup clutch 90, the lockup clutch 90 will be responsively engaged. A decline in the starting performance of the vehicle that is rolling down can be reliably reduced.

The present disclosure is not limited to the illustrated embodiment, and various modifications and design changes may be made without departing from the scope of the disclosure.

Figure 7:
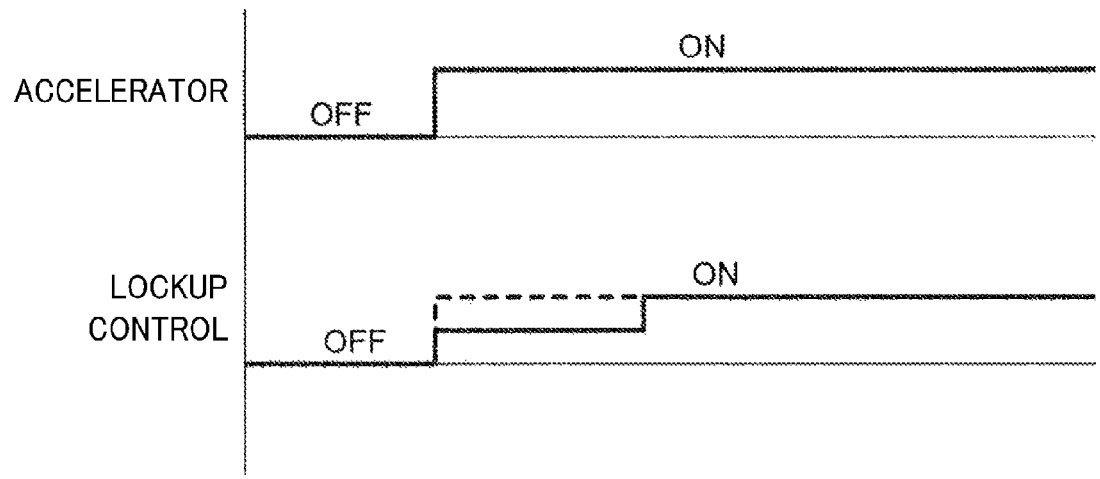
FIG. 7 is a time chart explaining how an automatic transmission according to a variation of this embodiment performs control when a vehicle has just started.
Figure 8:
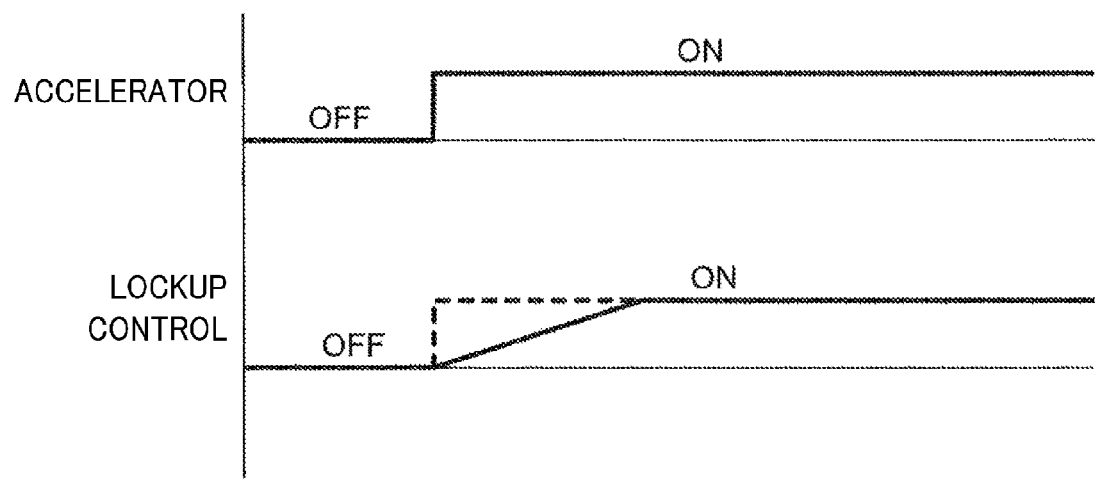
FIG. 8 is a time chart explaining how an automatic transmission according to another variation of this embodiment performs control when a vehicle has just started.

For example, in this embodiment, the start of the switching of the lockup clutch 90 from a released state to a slipping state is delayed. However, this is merely an example of the present disclosure. As illustrated in, for example, FIG. 7, the lockup clutch 90 may be controlled to shift from the released state to the slipping state in a stepwise manner by supplying substantially one half of the hydraulic pressure to the lockup clutch 90, for example. Alternatively, as illustrated in FIG. 8, the lockup clutch 90 may be controlled to gradually shift from the released state to the slipping state by gradually increasing the hydraulic pressure to be supplied to the lockup clutch 90.

In this embodiment, if the vehicle is sensed to have rolled down, control is performed such that the lockup control takes place only after the vehicle is prevented from rolling down. However, this is merely an example of the present disclosure. The period of time that has elapsed since the vehicle was sensed to have rolled down may be measured using a timer, and control may be performed to prevent lockup control until the period of time elapsed becomes greater than a predetermined period of time.

In this embodiment, the automatic transmission 1 mounted in the vehicle does not have to have only the configuration shown in FIGS. 1 and 3, and the present disclosure can be similarly used also in an automatic transmission 1 including a transmission mechanism 9 with a different configuration. Moreover, in this embodiment, the automatic transmission 1 is mounted in the vehicle. However, this is merely an example of the present disclosure. A continuously variable transmission or another suitable power transmission may be mounted.

In this embodiment, the vehicle stopped in the D range starts in this D range. However, this is merely an example of the present disclosure. This embodiment may be applied to, for example, a situation where a vehicle stopped in the N range starts after the D range has been selected, or a situation where the vehicle stopped in a neutral idling state, in which if the vehicle is stopped in the D range with a first gear selected, satisfaction of predetermined neutral conditions allows the transmission mechanism 9 to be neutral, starts after the D range has been again selected.

In this embodiment, the turbine rotation sensor 155 and the acceleration sensor 156 are used in combination as a rolling-down sensor. However, this is merely an example of the present disclosure. For example, as long as an output rotation sensor provided to the automatic transmission or the vehicle speed sensor 151 can distinguish between the forward and backward movements of the vehicle and determine the speed of each movement, any one of these sensors can be used alone.

What is claimed is:

1. An apparatus for controlling a vehicle, the apparatus comprising:
   a torque converter including a lockup clutch;
   a lockup controller configured to controllably move the lockup clutch from a released state in an engagement direction when the vehicle has just started;
   a rolling-down sensor configured to sense whether or not the vehicle that has just started has rolled down; and
   a lockup retarder configured to retard the movement of the lockup clutch in the engagement direction if the rolling-down sensor senses that the vehicle that has just started has rolled down.

2. The apparatus of claim 1, wherein
   if the rolling-down sensor senses that the vehicle that has just started has rolled down, the lockup retarder delays a start of the movement of the lockup clutch in the engagement direction.

3. The apparatus of claim 2, wherein
   if the rolling-down sensor senses that the vehicle has stopped rolling down, the lockup retarder stops retarding the movement of the lockup clutch in the engagement direction.

4. The apparatus of claim 3, wherein
   a clutch clearance of the lockup clutch is substantially zero when no engagement hydraulic pressure is supplied to the lockup clutch.

5. The apparatus of claim 2, wherein
   a clutch clearance of the lockup clutch is substantially zero when no engagement hydraulic pressure is supplied to the lockup clutch.

6. The apparatus of claim 1, wherein
   if the rolling-down sensor senses that the vehicle has stopped rolling down, the lockup retarder stops retarding the movement of the lockup clutch in the engagement direction.

7. The apparatus of claim 6, wherein
   a clutch clearance of the lockup clutch is substantially zero when no engagement hydraulic pressure is supplied to the lockup clutch.

8. The apparatus of claim 1, wherein
   a clutch clearance of the lockup clutch is substantially zero when no engagement hydraulic pressure is supplied to the lockup clutch.

9. A method for controlling a vehicle comprising a torque converter including a lockup clutch, and a lockup controller configured to controllably move the lockup clutch from a released state in an engagement direction when the vehicle has just started, the method comprising:
   sensing whether or not the vehicle that has just started has rolled down; and
   retarding the movement of the lockup clutch in the engagement direction if the vehicle that has just started is sensed to have rolled down.

* * * * *